(12) United States Patent
Igarashi (10) Patent No.: US 9,779,317 B2
(45) Date of Patent: Oct. 3, 2017

(54) IMAGE PROCESSING SYSTEM, IMAGE PROCESSING APPARATUS, AND METHOD FOR IMAGE PROCESSING

(71) Applicant: Masaaki Igarashi, Tokyo (JP)

(72) Inventor: Masaaki Igarashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/707,175

(22) Filed: May 8, 2015

(65) Prior Publication Data

US 2015/0332492 A1    Nov. 19, 2015

(30) Foreign Application Priority Data

May 13, 2014 (JP) ................ 2014-099797

(51) Int. Cl.
| | |
|---|---|
| G06K 15/00 | (2006.01) |
| G06F 3/12 | (2006.01) |
| G06F 17/00 | (2006.01) |
| G06K 9/03 | (2006.01) |
| G06T 11/60 | (2006.01) |
| H04N 1/00 | (2006.01) |

(52) U.S. Cl.
CPC .............. G06K 9/033 (2013.01); G06T 11/60 (2013.01); H04N 1/00 (2013.01); H04N 1/00005 (2013.01); H04N 1/00013 (2013.01); H04N 1/00076 (2013.01); H04N 1/00411 (2013.01); H04N 2201/0094 (2013.01)

(58) Field of Classification Search
None
See application file for complete search history.

(56) References Cited

U.S. PATENT DOCUMENTS

| | | | |
|---|---|---|---|
| 5,228,100 A * | 7/1993 | Takeda ................. | G06F 17/243 382/175 |
| 5,235,654 A * | 8/1993 | Anderson ............. | G06F 17/243 101/485 |
| 5,340,966 A * | 8/1994 | Morimoto ............. | G06K 17/00 235/376 |
| 5,448,375 A * | 9/1995 | Cooper ................ | H04N 1/2166 358/403 |
| 5,619,594 A * | 4/1997 | Melen ............... | G06F 17/30017 382/233 |

(Continued)

FOREIGN PATENT DOCUMENTS

JP    4980691    4/2012

*Primary Examiner* — Madelein Nguyen
(74) *Attorney, Agent, or Firm* — Oblon, McClelland, Maier & Neustadt, L.L.P.

(57) ABSTRACT

An image processing system includes a reading unit, a checking unit, a display control unit, and an image correcting unit. The reading unit reads image information from an original manuscript to generate image data. The checking unit checks whether or not a plurality of items listed in the original manuscript include an unentered item with the result of a character recognition process for recognizing a character contained in the image data. When the unentered item is present, the display control unit performs control to display information for informing a user of the unentered item. The image correcting unit adds a text with respect to the unentered item according to an input made by a user to correct the image data.

5 Claims, 8 Drawing Sheets

(56) References Cited

U.S. PATENT DOCUMENTS

| Patent/Pub. No. | | Date | Inventor | Classification |
|---|---|---|---|---|
| 5,692,073 A | * | 11/1997 | Cass | G06F 17/243 358/468 |
| 5,704,029 A | * | 12/1997 | Wright, Jr. | G06F 17/243 345/173 |
| 5,754,939 A | * | 5/1998 | Herz | G06Q 20/383 348/E7.056 |
| 5,862,223 A | * | 1/1999 | Walker | G06Q 10/063112 705/50 |
| 5,923,792 A | * | 7/1999 | Shyu | G06K 9/033 382/309 |
| 6,014,680 A | * | 1/2000 | Sato | G06F 17/211 715/234 |
| 6,292,473 B1 | * | 9/2001 | Duske, Jr. | H04B 7/18567 370/316 |
| 6,330,976 B1 | * | 12/2001 | Dymetman | G06F 3/03545 235/487 |
| 6,683,697 B1 | * | 1/2004 | Lech | G06K 9/00442 358/1.15 |
| 8,176,563 B2 | * | 5/2012 | Redlich | G06F 21/6209 713/166 |
| 8,358,964 B2 | * | 1/2013 | Radtke | G06F 3/03545 345/179 |
| 8,726,148 B1 | * | 5/2014 | Battilana | G06F 17/273 715/234 |
| 9,530,068 B2 | * | 12/2016 | Biegert | G06K 9/18 |
| 2002/0069220 A1 | * | 6/2002 | Tran | G06F 3/1454 715/209 |
| 2002/0152164 A1 | * | 10/2002 | Dutta | G06Q 20/04 705/43 |
| 2003/0002086 A1 | * | 1/2003 | Thomason | G06F 17/30011 358/448 |
| 2003/0033288 A1 | * | 2/2003 | Shanahan | G06F 17/3064 |
| 2003/0047494 A1 | * | 3/2003 | Lhomme | B07C 3/20 209/584 |
| 2003/0091233 A1 | * | 5/2003 | Lapstun | B41J 2/17503 382/187 |
| 2003/0188260 A1 | * | 10/2003 | Jensen | G06F 17/243 715/222 |
| 2004/0075867 A1 | * | 4/2004 | Watanabe | H04N 1/00127 358/2.1 |
| 2004/0103367 A1 | * | 5/2004 | Riss | G06F 17/2264 715/223 |
| 2004/0199443 A1 | * | 10/2004 | Gaston | G06Q 10/06 705/35 |
| 2004/0205448 A1 | * | 10/2004 | Grefenstette | G06F 17/30867 715/230 |
| 2004/0260569 A1 | * | 12/2004 | Bell | G06F 17/2785 705/7.27 |
| 2005/0209891 A1 | * | 9/2005 | Jacobus | G06Q 10/10 705/3 |
| 2005/0231746 A1 | * | 10/2005 | Parry | H04N 1/00352 358/1.13 |
| 2005/0276519 A1 | * | 12/2005 | Kitora | G06Q 10/10 382/305 |
| 2006/0190374 A1 | * | 8/2006 | Sher | G06Q 30/04 705/35 |
| 2006/0242063 A1 | * | 10/2006 | Peterson | G06Q 20/04 705/42 |
| 2006/0242164 A1 | * | 10/2006 | Evans | G06F 17/301 |
| 2006/0271847 A1 | * | 11/2006 | Meunier | G06K 9/00469 715/205 |
| 2007/0047008 A1 | * | 3/2007 | Graham | G06K 9/325 358/401 |
| 2007/0052997 A1 | * | 3/2007 | Hull | G06K 9/00463 358/1.15 |
| 2007/0168382 A1 | * | 7/2007 | Tillberg | G06F 17/30253 |
| 2007/0171482 A1 | * | 7/2007 | Iwasaki | H04N 1/3871 358/452 |
| 2007/0195378 A1 | * | 8/2007 | Yoshida | H04N 1/00795 358/470 |
| 2007/0198910 A1 | * | 8/2007 | Jensen | G06F 17/243 715/234 |
| 2008/0025608 A1 | * | 1/2008 | Meunier | G06K 9/00449 382/181 |
| 2008/0091636 A1 | * | 4/2008 | Ferlitsch | H04N 1/00002 |
| 2008/0252934 A1 | | 10/2008 | Arita et al. | |
| 2008/0293033 A1 | * | 11/2008 | Scicchitano | G07C 9/00158 434/350 |
| 2008/0314968 A1 | * | 12/2008 | Maher | G06Q 10/10 235/375 |
| 2009/0052804 A1 | * | 2/2009 | Lewis | G06F 17/30253 382/298 |
| 2009/0077165 A1 | * | 3/2009 | Rhodes | G06Q 10/06 709/203 |
| 2009/0089372 A1 | * | 4/2009 | Sacco | G06F 17/3089 709/204 |
| 2009/0245659 A1 | * | 10/2009 | Tzadok | G06K 9/033 382/224 |
| 2009/0279110 A1 | * | 11/2009 | Ito | G06K 1/121 358/1.5 |
| 2009/0282009 A1 | * | 11/2009 | Levey | G06K 9/00442 |
| 2010/0061655 A1 | * | 3/2010 | Ma | G06K 9/40 382/275 |
| 2010/0150448 A1 | * | 6/2010 | Lecerf | G06F 17/3061 382/190 |
| 2010/0161345 A1 | * | 6/2010 | Cain | G06F 19/327 705/2 |
| 2010/0172590 A1 | * | 7/2010 | Foehr | H04N 1/00326 382/217 |
| 2010/0174976 A1 | * | 7/2010 | Mansfield | G06F 17/211 715/234 |
| 2010/0202691 A1 | * | 8/2010 | Hamada | H04N 1/00326 382/181 |
| 2010/0278453 A1 | * | 11/2010 | King | G06Q 10/10 382/321 |
| 2010/0306260 A1 | * | 12/2010 | Dejean | G06F 17/2745 707/776 |
| 2011/0002014 A1 | * | 1/2011 | Tani | H04N 1/00244 358/403 |
| 2011/0141510 A1 | * | 6/2011 | Garg | H04N 1/00331 358/1.15 |
| 2011/0212430 A1 | * | 9/2011 | Smithmier | G09B 5/06 434/322 |
| 2011/0286023 A1 | * | 11/2011 | Hagisawa | G06F 17/243 358/1.13 |
| 2012/0079370 A1 | * | 3/2012 | Dejean | G06K 9/00463 715/246 |
| 2012/0087537 A1 | * | 4/2012 | Liu | G06K 9/00469 382/100 |
| 2012/0105653 A1 | * | 5/2012 | Yoshida | G06F 3/0317 348/207.99 |
| 2012/0120444 A1 | * | 5/2012 | Hirohata | G06K 9/00449 358/1.15 |
| 2012/0120448 A1 | * | 5/2012 | Komaba | H04N 1/00222 358/1.15 |
| 2012/0263380 A1 | * | 10/2012 | Terao | G06F 17/2217 382/182 |
| 2013/0117652 A1 | * | 5/2013 | Folsom | G06F 17/243 715/222 |
| 2013/0156322 A1 | * | 6/2013 | Yaros | G06K 9/3266 382/195 |
| 2013/0232041 A1 | * | 9/2013 | Nuggehalli | G06Q 10/105 705/30 |
| 2013/0275863 A1 | * | 10/2013 | Rogers | G06F 17/227 715/239 |
| 2014/0088985 A1 | * | 3/2014 | Grant | G06F 19/325 705/2 |
| 2014/0237342 A1 | * | 8/2014 | King | G06F 17/243 715/224 |
| 2014/0258838 A1 | * | 9/2014 | Evers | G06F 17/243 715/234 |
| 2014/0281871 A1 | * | 9/2014 | Brunner | G06F 17/243 715/226 |
| 2014/0337189 A1 | * | 11/2014 | Barsade | G06Q 40/123 705/31 |
| 2015/0043042 A1 | * | 2/2015 | Kato | H04N 1/12 358/474 |

(56) References Cited

U.S. PATENT DOCUMENTS

| | | | |
|---|---|---|---|
| 2015/0066895 A1* | 3/2015 | Komissarchik | G06Q 50/01 707/709 |
| 2015/0187022 A1* | 7/2015 | Takahashi | G06Q 40/12 705/30 |
| 2015/0278619 A1* | 10/2015 | Pakhchanian | G06K 9/6263 382/310 |
| 2015/0286860 A1* | 10/2015 | Ruiz-Tapiador | G06K 9/32 382/112 |
| 2015/0304521 A1* | 10/2015 | Campanelli | G06K 15/1889 358/1.18 |
| 2015/0317296 A1* | 11/2015 | Vohra | G06F 17/30011 715/221 |
| 2015/0332492 A1* | 11/2015 | Igarashi | H04N 1/00411 358/452 |
| 2016/0042320 A1* | 2/2016 | Dearing | B07C 3/00 705/338 |
| 2016/0062972 A1* | 3/2016 | Ramakrishnan | G06F 17/243 715/226 |
| 2016/0182741 A1* | 6/2016 | Takei | H04N 1/0044 358/1.6 |

\* cited by examiner

THERE IS AN ITEM NOT BEING DISPLAYED
[Q3]

QUESTIONNAIRE ID=1

Q1. WHAT TIME DO YOU GET UP? (REQUIRED)

7:00

Q2. WHAT TIME DO YOU GO TO BED? (REQUIRED)

23:00

Q3. DO YOU DRINK? (REQUIRED)

(BLANK)

NAME (REQUIRED)

ICHIRO SATO

FIG.9B

QUESTIONNAIRE ID=2

Q1. WHAT TIME DO YOU GET UP? (REQUIRED)

7:00

Q2. WHAT TIME DO YOU GO TO BED? (REQUIRED)

23:00

Q3. DO YOU DRINK? (REQUIRED)

YES

NAME (REQUIRED)

TARO SUZUKI

FIG.10A

Q1. xxxxx (REQUIRED)

FIG.10B

NAME (REQUIRED)

FIG.11

```
--CSV FILE FOR COMPILED RESULT OF
          THE ABOVE--
Question, ICHIRO SATO, TARO SUZUKI
       Q1, 7:00, 8:00
       Q2, 23:00, 23:30
       Q3, , YES
       ----
```

IMAGE PROCESSING SYSTEM, IMAGE PROCESSING APPARATUS, AND METHOD FOR IMAGE PROCESSING

CROSS-REFERENCE TO RELATED APPLICATIONS

The present application claims priority to and incorporates by reference the entire contents of Japanese Patent Application No. 2014-099797 filed in Japan on May 13, 2014.

BACKGROUND OF THE INVENTION

1. Field of the Invention

The present invention relates to an image processing system, an image processing apparatus, and a method for image processing.

2. Description of the Related Art

Techniques for facilitating the editing of document data obtained by computerizing paper document have been conventionally known. For example, Japanese Patent No. 4980691 discloses a configuration in which information about setting items unique to a document database is linked to a document with a groupware server to simplify the editing of document data.

Such conventional techniques, however, have no mechanism capable of detecting whether or not a manuscript includes an omission and allowing, if there is an omission, a user to perform an adding operation easily.

In view of the above problem, there is a need to provide an image processing system, an image processing apparatus, and a method for image processing capable of detecting whether or not a manuscript includes an omission and allowing, if there is an omission, a user to perform an adding operation easily.

SUMMARY OF THE INVENTION

It is an object of the present invention to at least partially solve the problems in the conventional technology.

According to the present invention, there is provided an image processing system comprising: a reading unit that reads image information from an original manuscript to generate image data; a checking unit that checks whether or not a plurality of items listed in the original manuscript include an unentered item with a result of a character recognition process for recognizing a character contained in the image data; a display control unit that performs, when the unentered item is present, control to display information for informing a user of the unentered item; and an image correcting unit that adds a text with respect to the unentered item according to an input made by the user to correct the image data.

The present invention also provides an image processing apparatus comprising: a reading unit that reads image information from an original manuscript to generate image data; a checking unit that checks whether or not a plurality of items listed in the original manuscript include an unentered item on the basis of a result of a character recognition process for recognizing a character contained in the image data; a display control unit that performs, when the unentered item is present, control to display an existence of the unentered item; and an image correcting unit that adds a text with respect to the unentered item according to an input made by a user to correct the image data.

The present invention also provides an image processing method comprising: a reading step of reading image information from an original manuscript to generate image data; a checking step of checking whether or not a plurality of items listed in the original manuscript include an unentered item on the basis of a result of a character recognition process for recognizing a character contained in the image data; a display control step of performing, when the unentered item is present, control to display an existence of the unentered item; and an image correcting step of adding a text with respect to the unentered item according to an input made by a user to correct the image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an image processing system, an image processing apparatus, and a method for image processing according to the present invention will now be described below in detail with reference to the accompanying drawings. Although the following description will be made with respect to a case where the image processing apparatus according to the present invention is used in a multifunction peripheral (MFP) having at least a print function and a scanner function, the invention is not limited thereto.

First Embodiment

Figure 1:
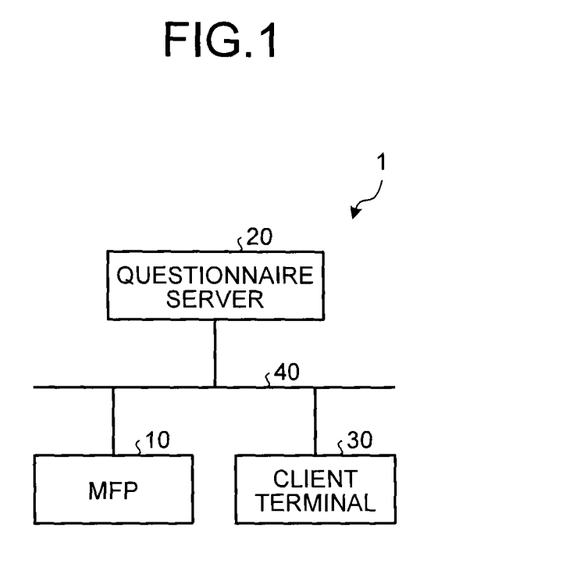
FIG. 1 is a diagram illustrating a configuration example of an image processing system according to an embodiment of the present invention.

As shown in FIG. 1, an image processing system 1 according to the present embodiment includes an MFP 10, a questionnaire server 20, and a client terminal 30. Note that the number of the MFPs 10 included in the image processing system 1 is not limited to one. For example, a configuration in which two or more MFPs 10 are included in a single image processing system 1 is possible. Moreover, in the example of FIG. 1, the MFP 10, the questionnaire server 20, and the client terminal 30 are connected to one another via a network 40 such as a LAN, for example. The client terminal 30 is a terminal used by a user and may be a personal computer (PC), for example.

Figure 2:
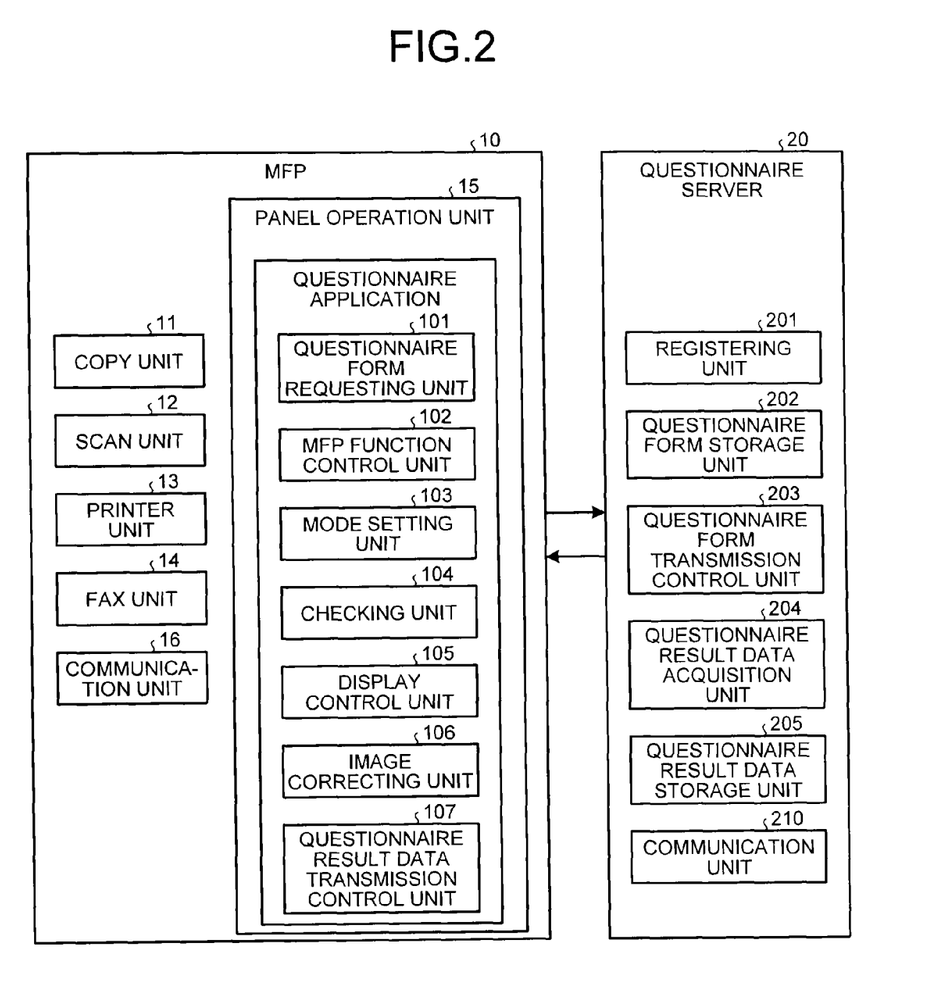
FIG. 2 is a diagram illustrating an example of functional configurations of an MFP and a questionnaire server according to a first embodiment of the present invention.

FIG. 2 is a diagram showing an example of functional configurations of the MFP 10 and the questionnaire server 20. As shown in FIG. 2, the MFP 10 includes: a copy unit 11; a scan unit 12; a printer unit 13; a fax unit 14; a panel operation unit 15; and a communication unit 16. The communication unit 16 is an interface for connecting the MFP 10 to the network 40.

The copy unit 11 provides a copy function of the MFP 10. The scan unit 12 provides a scan function of the MFP 10. More specifically, the scan unit 12 has the function of reading image information from an original manuscript and generating image data. The scan unit 12 can be considered as corresponding to a "reading unit" in claims. The printer unit 13 provides a printer function of the MFP 10. The fax unit 14 provides a facsimile transmission function of the MFP 10.

The panel operation unit 15 receives a user's operation and displays various information. In this example, a main unit of the MFP 10, including the copy unit 11, the scan unit 12, the printer unit 13, and the fax unit 14, and the panel operation unit 15 operate independently of each other with different operating systems. However, the present invention is not limited thereto. A configuration in which the main unit and the panel operation unit 15 operate with the same operating system may be employed.

An application set in the panel operation unit 15 is a software (program) for providing a user interface (UI) function used for operations and display mainly about the functions provided by the copy unit 11, the scan unit 12, the printer unit 13, and the fax unit 14. In the present embodiment, the panel operation unit 15 has a hardware configuration that utilizes a computer device including: a CPU; a storage such as a ROM or a RAM; a communication interface for connecting to the network 40; and a display unit for displaying various images. The CPU mounted in the panel operation unit 15 can provide various functions by executing a program/programs. In the present embodiment, a software for providing work service on questionnaires (hereinafter sometimes referred to as a "questionnaire application") is set in the panel operation unit 15. Functions regarding the questionnaire application will be described mainly below.

Note that the "questionnaire" means a questionnaire survey. In this example, a format (form) in which an answer column used for writing an answer is provided for each of one or more items is employed. The form of a questionnaire is sometimes referred to as a "questionnaire form" in the following description. In this example, a user can prepare a questionnaire form on the client terminal 30 and register the prepared questionnaire form in the questionnaire server 20.

As shown in FIG. 2, the questionnaire application includes: a questionnaire form requesting unit 101; an MFP function control unit 102; a mode setting unit 103; a checking unit 104; a display control unit 105; an image correcting unit 106; and a questionnaire result data transmission control unit 107.

The questionnaire form requesting unit 101 performs control to display, on the panel operation unit 15, a selection screen from which a questionnaire form registered in the questionnaire server 20 to be described later is selected according to a user's operation. The questionnaire form requesting unit 101 then selects one of questionnaire forms according to a user's operation on the selection screen and requests the selected questionnaire form to the questionnaire server 20. Once the questionnaire form is obtained from the questionnaire server 20, the questionnaire form requesting unit 101 requests the MFP function control unit 102 to print out the obtained questionnaire form.

The MFP function control unit 102 provides the copy function, the scan function, the printer function, and the fax function in cooperation with and utilizing the copy unit 11, the scan unit 12, the printer unit 13, and the fax unit 14, respectively. In this example, a combination of the MFP function control unit 102 and the scan unit 12 can be considered as corresponding to the "reading unit" in claims. Once the MFP function control unit 102 receives a request for printing out the questionnaire form from the questionnaire form requesting unit 101, the MFP function control unit 102 performs control to cause the printer unit 13 to print out the questionnaire form. Consequently, a questionnaire sheet (questionnaire sheet which has not been answered yet) corresponding to the questionnaire form is outputted. The user writes an answer by hand for each of one or more items listed in the questionnaire sheet.

When the mode setting unit 103 receives an operation of selecting a mode for scanning the answered questionnaire sheet (hereinafter sometimes referred to as an "entry value checking mode"), the mode setting unit 103 sets an operation mode in the scan function to the entry value checking mode. The image data generated by the scan unit 12 in the entry value checking mode is regarded as image data generated by reading image information from the answered questionnaire sheet. For example, the panel operation unit 15 displays a button used for selecting the entry value checking mode. The user can perform an input of selecting the entry value checking mode by pressing down the button. The user then sets the answered questionnaire sheet and performs an operation of giving an instruction to scan the sheet. The MFP function control unit 102, which has received this operation, performs control to cause the scan unit 12 to carry out a scanning process (a process of reading image information from a set original manuscript and generating its image data).

With the result of a character recognition process for recognizing characters contained in the image data generated by the scan unit 12, the checking unit 104 checks whether or not the plurality of items listed in the manuscript include an unentered item. In this example, the checking unit 104 performs a known OCR process on the image data generated by the scan unit 12 in the entry value checking mode. With the result of the OCR process, the checking unit 104 checks if the plurality of items listed in the answered questionnaire sheet include an item for which no answer has been entered.

In the presence of an unentered item, the display control unit 105 performs control to display information for informing the user of the unentered item. In the present embodiment, when the plurality of items listed in the answered questionnaire sheet include an item for which no answer has been entered, the display control unit 105 performs control to display, on the panel operation unit 15, information for informing the user about the item for which no answer has been entered. The user, who has checked this information, can complete an answer to the unentered item in handwriting or with the use of a function of the questionnaire application.

For example, the panel operation unit 15 displays a button used for selecting that an answer to the unentered item is completed with the function of the questionnaire application. By pressing down the button, the user can perform an input of selecting that an answer to the unentered item is completed with the function of the questionnaire application.

The image correcting unit 106 adds a text with respect to the unentered item according to a user's input to correct the image data (the image data generated by the scan unit 12). In the present embodiment, when the input of selecting that the answer to the unentered item is completed with the function of the questionnaire application is received, the image correcting unit 106 performs control to display, on the panel operation unit 15, the image data generated by the scan unit 12 in the entry value checking mode (the image data of the answered questionnaire sheet including an item for which no answer has been entered). The user can input an answer to the item for which no answer has been entered by operating a soft keyboard, or the like, while checking this image data. The image correcting unit 106 adds the answer to the item for which no answer has been entered according to the user's input to correct (edit) the image data.

The questionnaire result data transmission control unit 107 performs control to transmit the image data generated by the scan unit 12 (image data on which no correction has been made by the image correcting unit 106) or the image data on which a correction has been made by the image correcting unit 106 to the questionnaire server 20 to be described later as questionnaire result data.

Although the above scan unit 12, checking unit 104, display control unit 105, and image correcting unit 106 are mounted in a single MFP 10 in the present embodiment, the present invention is not limited thereto. For example, these units may be mounted separately into a plurality of devices. In short, it is only required that an image processing system to which the present invention is applied has a configuration including a function corresponding to the above scan unit 12, a function corresponding to the checking unit 104, a function corresponding to the display control unit 105, and a function corresponding to the image correcting unit 106.

The function of the questionnaire server 20 will be described next. The questionnaire server 20 has a function of accumulating information about questionnaire forms, questionnaire result data, and the like.

As shown in FIG. 2, the questionnaire server 20 includes a registering unit 201, a questionnaire form storage unit 202, a questionnaire form transmission control unit 203, a questionnaire result data acquisition unit 204, a questionnaire result data storage unit 205, and a communication unit 210. The communication unit 210 is an interface for connecting to the network 40 (an interface for connecting to the MFP 10 or the client terminal 30 from a different perspective).

The registering unit 201 performs control to register the questionnaire form produced by the client terminal 30 in the questionnaire form storage unit 202. The questionnaire form transmission control unit 203 performs control to transmit the questionnaire form registered in the questionnaire form storage unit 202 to the MFP 10 in response to a request from the MFP 10 (the questionnaire form requesting unit 101). The questionnaire result data acquisition unit 204 acquires questionnaire result data transmitted from the MFP 10 (the questionnaire result data transmission control unit 107). The questionnaire result data storage unit 205 stores the questionnaire result data acquired by the questionnaire result data acquisition unit 204.

In the present embodiment, the questionnaire server 20 has a hardware configuration that utilizes a computer device including a CPU, a storage such as a ROM or a RAM, a communication interface for connecting to the network 40, and a display unit for displaying various images. The CPU mounted in the questionnaire server 20 can provide the function of each unit (such as the registering unit 201) in the above questionnaire server 20 by executing a program/programs.

Figure 3:
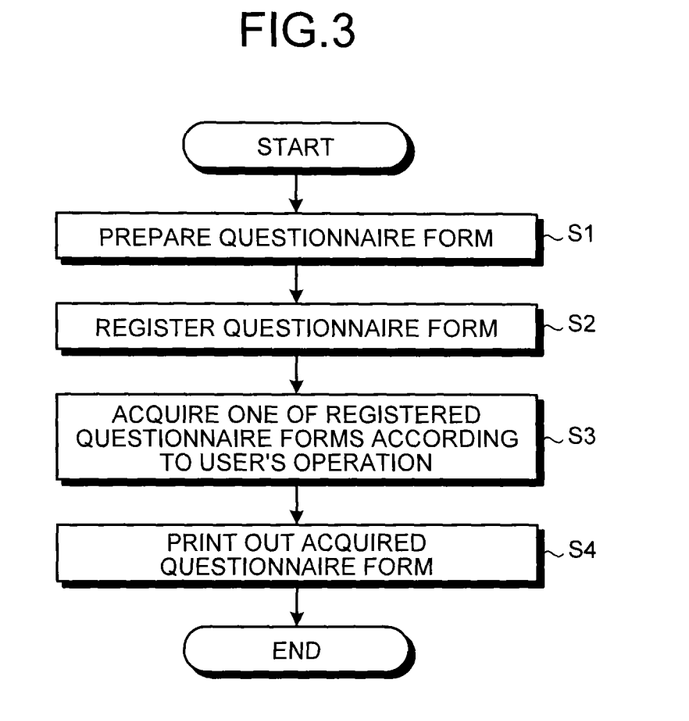
FIG. 3 is a flowchart illustrating a procedure from the preparation of a questionnaire form to the printing-out of the questionnaire form.

FIG. 3 is a flowchart illustrating a procedure from the preparation of a questionnaire form to the printing-out of the questionnaire form. As shown in FIG. 3, the client terminal 30 first prepares a questionnaire form according to a user's input (step S1), and the questionnaire server 20 registers the questionnaire form produced by the client terminal 30 (step S2). Next, the MFP 10 requests one of the registered questionnaire forms to the questionnaire server 20 according to a user's input and acquires the requested questionnaire form (step S3). Next, the MFP 10 prints out the acquired questionnaire form (step S4). This yields a questionnaire sheet which has not been answered yet. The user writes an answer by hand for each of one or more items listed in the questionnaire sheet.

Figure 4:
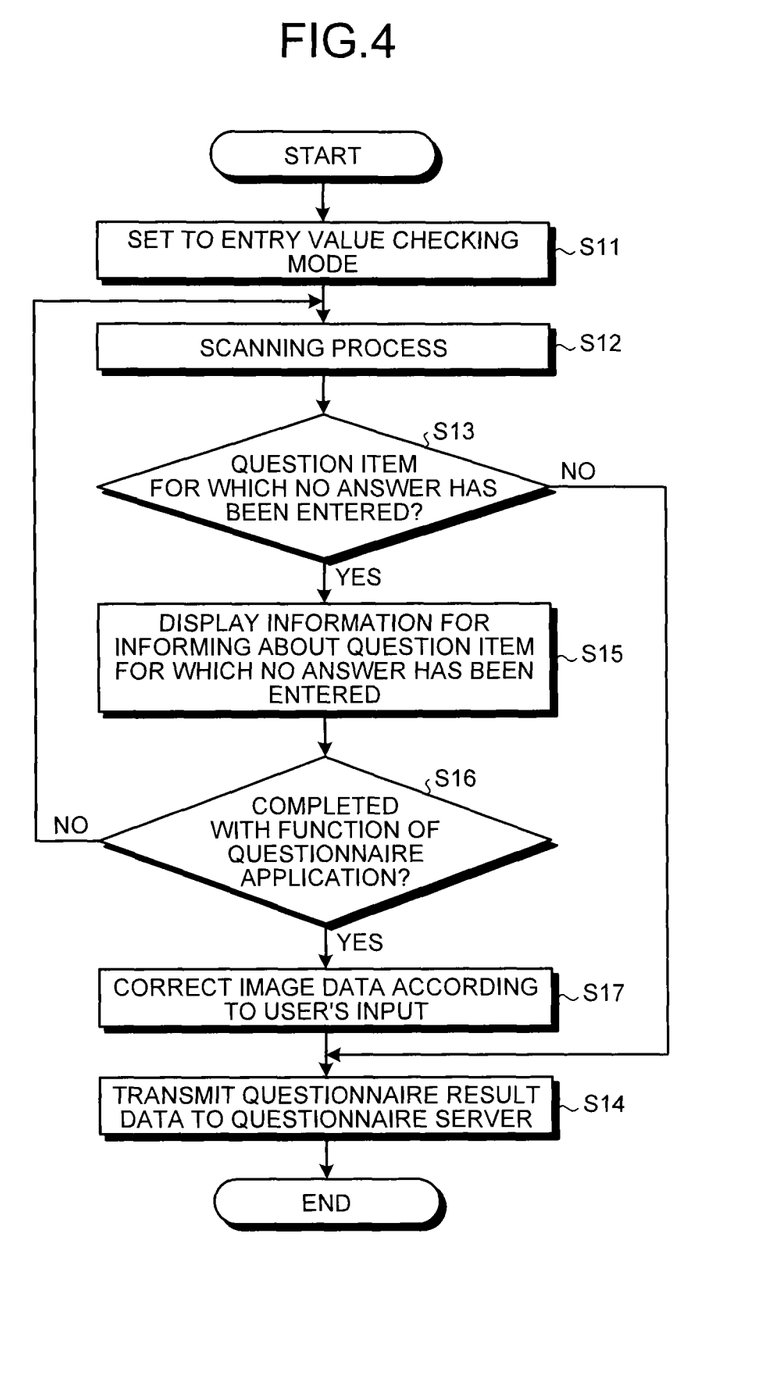
FIG. 4 is a flowchart illustrating an operation example of a questionnaire application in the first embodiment.

FIG. 4 is a flowchart illustrating an operation example of the questionnaire application. In this example, the user, who has finished writing answers to the questionnaire sheet, presses down the button displayed on the panel operation unit 15 for selecting the entry value checking mode. The mode setting unit 103, which has received this operation, sets the operation mode in the scan function to the entry value checking mode (step S11). The user then sets the answered questionnaire sheet and performs an operation of giving an instruction to scan the sheet. The MFP function control unit 102, which has received this operation, performs control to cause the scan unit 12 to carry out the scanning process (step S12).

Next, the checking unit 104 performs the OCR process on the image data generated by the scanning process in the step S12. With the result of the OCR process, the checking unit 104 checks whether or not the plurality of items listed in the answered questionnaire sheet include an item for which no answer has been entered (step S13). In the absence of an item for which no answer has been entered (step S13: No), the questionnaire result data transmission control unit 107 performs control to transmit the image data generated by the scanning process in the step S12 to the questionnaire server 20 as questionnaire result data (step S14).

In the presence of an item for which no answer has been entered (step S13: Yes), on the other hand, the display control unit 105 performs control to display information for informing about the existence of an item for which no answer has been entered (step S15). When the input of selecting that an answer to the unentered item is completed with the function of the questionnaire application is received (step S16: Yes), the image correcting unit 106 performs control to display the image data generated by the scanning process in the step S12. The image correcting unit 106 then adds the answer to the item for which no answer has been entered in response to a user's input to correct the image data (step S17). The questionnaire result data transmission control unit 107 then performs control to transmit the image data corrected by the image correcting unit 106 in the step S17 to the questionnaire server 20 as questionnaire result data (step S14).

On the other hand, when no input of instructing that an answer to the unentered item is completed with the function of the questionnaire application is received in the above step S16 (step S16: No), the user completes the answer in handwriting, then sets the completed questionnaire sheet, and performs an operation of giving an instruction to scan the sheet. The MFP function control unit 102, which has received this operation, performs control to cause the scan unit 12 to carry out the scanning process (step S12). Thereafter, the above step S13 and the following processes are repeated.

As described above, the result of the OCR process on the image data generated by reading image information from the answered questionnaire sheet is used to check whether or not the plurality of items listed in the questionnaire sheet include an item for which no answer has been entered in the present embodiment. In the presence of an item for which no answer has been entered, the control to display information for informing a user of the item for which no answer has been entered is performed and a text with respect to the item for which no answer has been entered is added according to a user's input to correct the image data. Thus, a mechanism capable of detecting whether or not an answered questionnaire sheet includes an omission and allowing, if there is an omission, a user to perform an adding operation easily can be achieved.

Second Embodiment

The second embodiment will now be described next. A description regarding elements common to the above first embodiment will be omitted as appropriate. In the second embodiment, when no answer has been entered to a required item, which is an item required to be answered, the display control unit 105 performs control to display information for informing that no answer has been entered to the required item. When no answer has been entered to an optional item for which answering is optional, on the other hand, the display control unit 105 does not perform control to display information for informing that no answer has been entered to the optional item.

Figure 5:
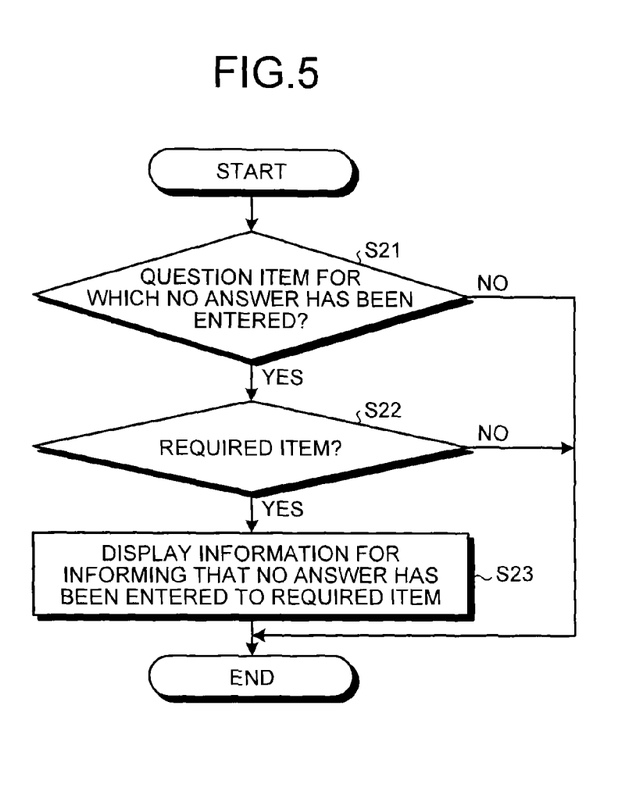
FIG. 5 is a flowchart illustrating an operation example of a questionnaire application in a second embodiment of the present invention.

FIG. 5 is a flowchart for explaining a process in the second embodiment corresponding to the steps S13 and S15 in FIG. 4. Since the contents of the other processes are the same as those in the first embodiment, the detailed description thereof will be omitted. As shown in FIG. 5, the checking unit 104 performs, in step S21, the OCR process on the image data generated by the scanning process in the step S12. With the result of the OCR process, the checking unit 104 checks whether or not the plurality of items listed in the answered questionnaire sheet include an item for which no answer has been entered. In the presence of an item for which no answer has been entered (step S21: Yes), the checking unit 104 checks whether or not the item is a required item (step S22). In this example, the checking unit 104 determines whether the item for which no answer has been entered is a required item or an optional item by performing the OCR process. However, the present invention is not limited thereto. Any method for determining whether the item for which no answer has been entered is a required item or an optional item can be used.

When the item for which no answer has been entered is a required item (step S22: Yes), the display control unit 105 performs control to display information for informing that no answer has been entered to the required item (step S23). When the item for which no answer has been entered is an optional item (step S22: No), the process ends without performing control to display information for informing that no answer has been entered to the optional item by the display control unit 105.

Figure 6A:
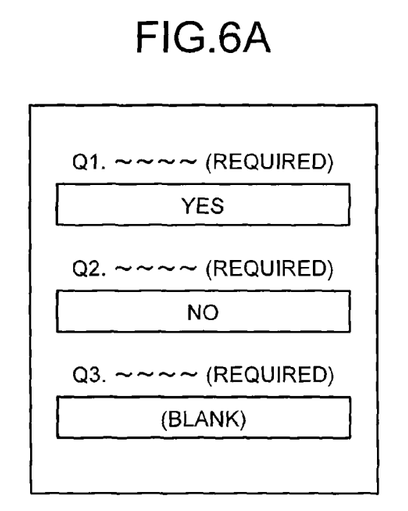
FIGS. 6A and 6B each show an example of an answered questionnaire sheet.
Figure 6B:
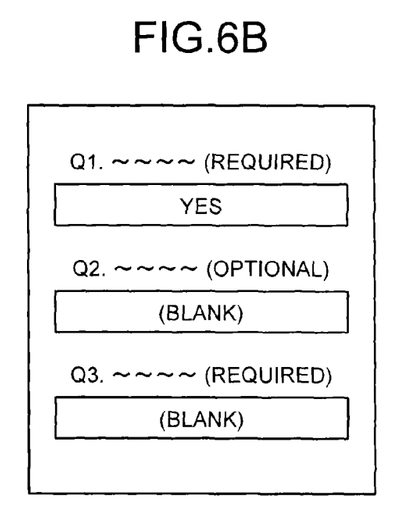
Figure 7:
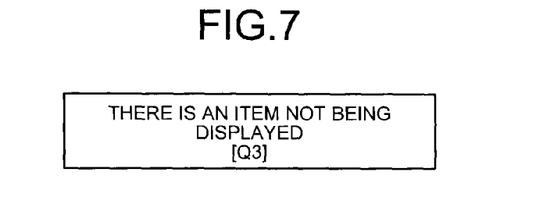
FIG. 7 is a diagram illustrating an example of information for informing a user that no answer has been entered to a required item.

In the present embodiment, when no answer has been entered to "Q3" which is a required item, as shown in FIG. 6A, for example, the display control unit 105 performs control to display, on the panel operation unit 15, information for informing the user that no answer has been entered to "Q3" which is a required item, as shown in FIG. 7. When no answers have been entered to "Q3" which is a required item, and "Q2" which is an optional item, as shown in FIG. 6B, for example, the display control unit 105 performs control to display, on the panel operation unit 15, information for informing the user that no answer has been entered to "Q3" which is a required item, but does not perform control to display, on the panel operation unit 15, information for informing the user that no answer has been entered to "Q2" which is an optional item, as shown in FIG. 7.

Third Embodiment

The third embodiment will now be described next. A description regarding elements common to the above embodiments will be omitted as appropriate. The third embodiment further includes the function of compiling entries for each of items across pieces of questionnaire result data. The display control unit 105 performs control to display the compiled result.

Figure 8:
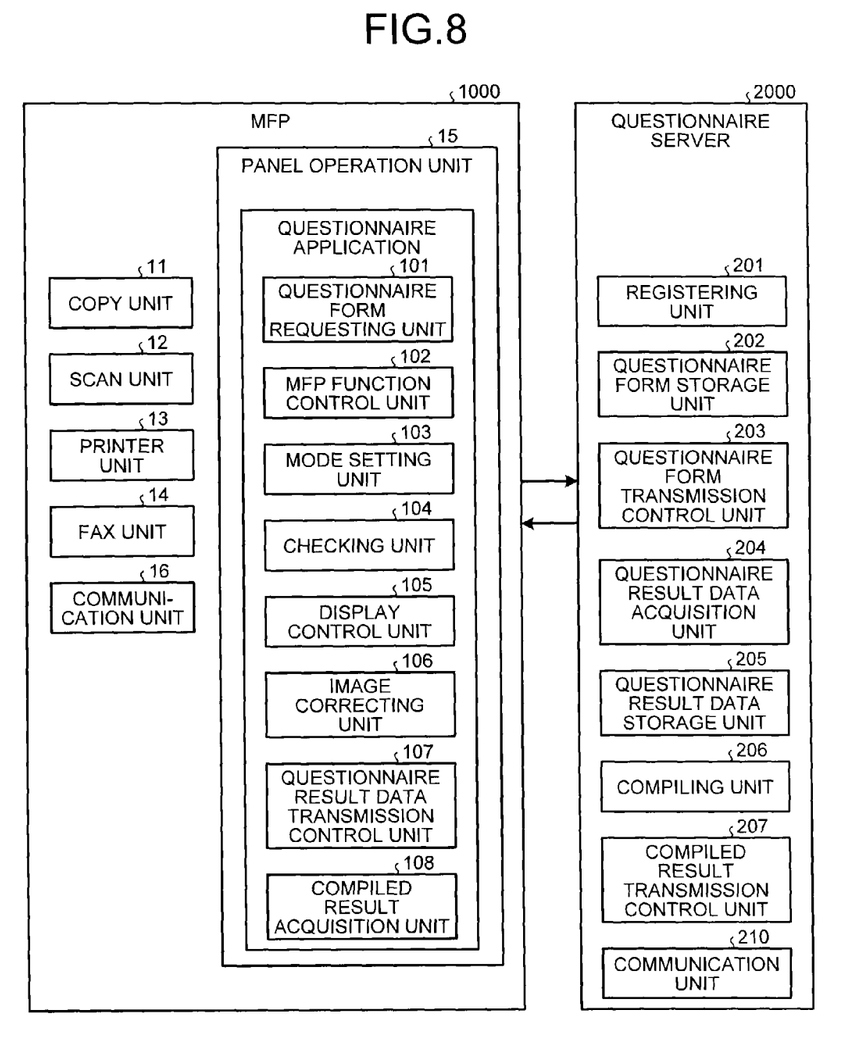
FIG. 8 is a diagram illustrating an example of functional configurations of an MFP and a questionnaire server according to a third embodiment of the present invention.

FIG. 8 is a diagram showing an example of functional configurations of an MFP 1000 and a questionnaire server 2000 according to the third embodiment. As shown in FIG. 8, the questionnaire server 2000 further includes a compiling unit 206 and a compiled result transmission control unit 207. A questionnaire application set in the MFP 1000 further includes a compiled result acquisition unit 108.

Figure 9A:
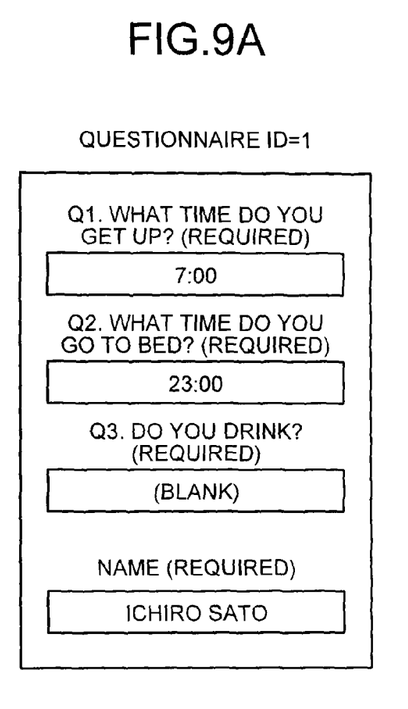
FIGS. 9A and 9B each is a diagram illustrating an example of a questionnaire form.
Figure 9B:
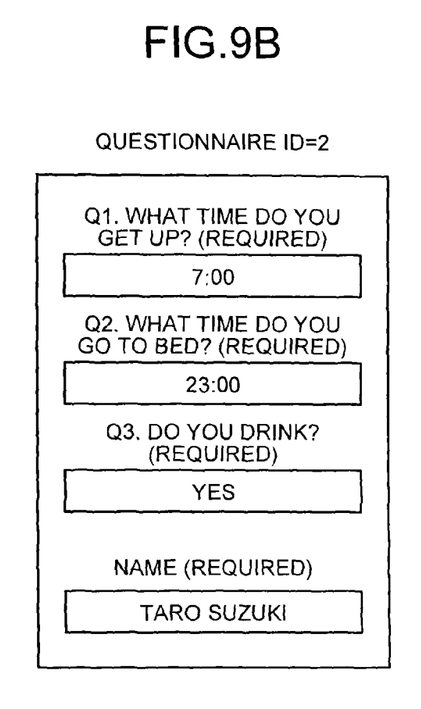
Figure 10A:
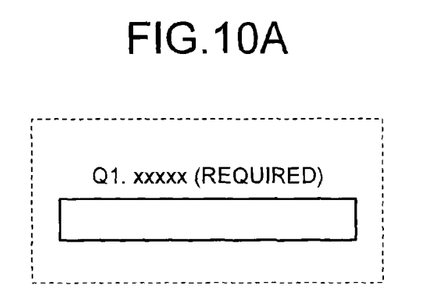
FIGS. 10A and 10B each shows an example of a questionnaire recognition form.
Figure 10B:
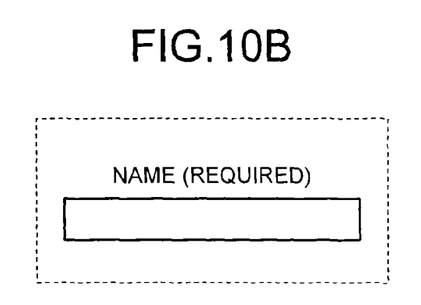

The compiling unit 206 compiles entries for each of the items across pieces of questionnaire result data stored in the questionnaire result data storage unit 205. In this example, each questionnaire result data is identified by a unique ID. For example, an identifier (ID) such as a number, a bar code, or a two-dimensional bar code may be given to a questionnaire sheet. Each of FIGS. 9A and 9B is a diagram showing an example of a questionnaire form. As shown in FIGS. 9A and 9B, the questionnaire form includes a plurality of questions and a name item. With regard to questions, a "questionnaire recognition form (question)" as shown in FIG. 10A, for example, may be registered in advance and the corresponding question item in the questionnaire result data can be identified by means of image recognition. With regard to names, a "questionnaire recognition form (name)" as shown in FIG. 10B, for example, may be similarly registered in advance and the name item in the questionnaire result data can be identified by means of image recognition. Also, whether the item is a required item or an optional item is determined by the recognition of characters in this example.

Figure 11:
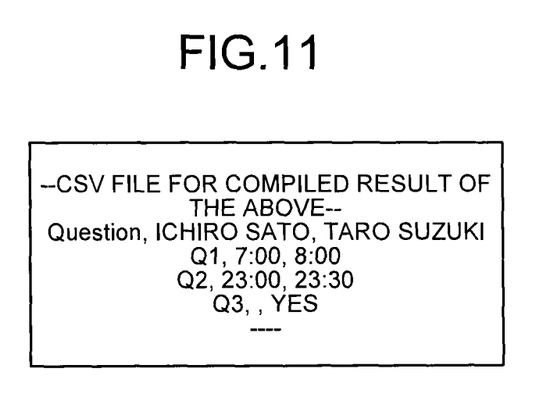
FIG. 11 is a diagram showing an example of a CSV file.

The compiling unit 206 loads and compiles entries for each of items across pieces of questionnaire result data stored in the questionnaire result data storage unit 205. The compiling unit 206 generates a CSV file as shown in FIG. 11 as the compiled result.

The compiled result transmission control unit 207 performs control to transmit the compiled result produced by the compiling unit 206 to the MFP 1000 (panel operation unit 15). The compiled result acquisition unit 108 of the questionnaire application acquires the compiled result and the display control unit 105 can perform control to display the compiled result.

Although the embodiments according to the present invention have been described above, the present invention is not limited to the embodiments exactly as described. The present invention can be embodied upon implementation by modifying the components without departing from the scope of the invention. Moreover, various inventions can be made by appropriately combining the plurality of components disclosed in the above embodiments.

For example, a part (for example, the checking unit 104) of the plurality of functions processed by the above questionnaire application may be provided on the side of the questionnaire server 20. In short, it is only required that an image processing system to which the present invention is applied has a configuration including a function corresponding to the above scan unit 12 (or a combination of the scan unit 12 and the MFP function control unit 102), a function corresponding to the checking unit 104, a function corresponding to the display control unit 105, and a function corresponding to the image correcting unit 106.

The programs to be executed by the above MFP 10 and questionnaire server 20 each may be recorded in a computer readable recording medium such as a CD-ROM, a flexible disk (FD), a CD-R, a digital versatile disk (DVD), or a universal serial bus (USB) memory as an installable or executable file and provided. Alternatively, such programs may be provided or distributed via a network such as the Internet. Alternatively, various programs may be preloaded into a non-volatile recording medium such as a ROM and provided.

The present invention can provide a mechanism capable of detecting whether a manuscript includes an omission and allowing, if there is an omission, a user to perform an adding operation easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
   image processing circuitry that includes at least a scanner and a printer, and
   operation interface circuitry that provides an interface to control the scanner and the printer, wherein
   the image processing circuitry includes a first processor executing a first operating system, and a communication interface,
   the operation interface circuitry includes a second processor executing a second operating system, and an application that is executed under the second operation system, wherein the operation interface circuitry operates independently of the image processing circuitry, and
   the second processor is configured to
      display, by executing the application, a selection screen from which a questionnaire form registered in a server is selected,
      receive the questionnaire form that is selected using the selection screen from the server via the communication interface of the image processing circuitry,
      cause the printer to print out a questionnaire sheet of the questionnaire form,
      cause the scanner to read the questionnaire sheet in which a user has written an answer by hand,
      check if the read answered questionnaire sheet includes a non-answered item based on a result of an optical character recognition process performed on the read answered questionnaire sheet, and
      control to display, when the read answered questionnaire sheet includes the non-answered item, information for informing the user of the non-answered item.

2. The image processing apparatus of claim 1, wherein the scanner is configured to read image information from the answered questionnaire sheet.

3. The image processing apparatus of claim 2, wherein the operation interface circuitry further includes a questionnaire result data memory that stores the image information as questionnaire result data, and
   the second processor is further configured to compile entries for each of the items across pieces of the questionnaire result data.

4. The image processing apparatus of claim 3, wherein the second processor performs control to display a compiled result produced by the second processor.

5. An image processing method executed by a second processor included in operation interface circuitry of an image processing apparatus, the second processor executing a second operating system and an application, the image processing apparatus including image processing circuitry that includes at least a scanner and a printer, and the operation interface circuitry, which provides an interface to control the scanner and the printer, wherein the image processing circuitry includes a first processor executing a first operating system, and a communication interface, wherein the operation interface circuitry operates independently of the image processing circuitry, the method comprising:
   displaying, by executing the application, a selection screen from which a questionnaire form registered in a server is selected,
   receiving the questionnaire form that is selected using the selection screen from the server via the communication interface of the image processing circuitry,
   causing the printer to print out a questionnaire sheet of the questionnaire form,
   causing the scanner to read the questionnaire sheet in which a user has written an answer by hand,
   checking if the read answered questionnaire sheet includes a non-answered item based on a result of an OCR process performed on the read answered questionnaire sheet, and
   controlling to display, when the read answered questionnaire sheet includes the non-answered item, information for informing the user of the non-answered item.

* * * * *